(No Model.)
A. FOUGÈRE.
NUT LOCK.
No. 522,937. Patented July 10, 1894.
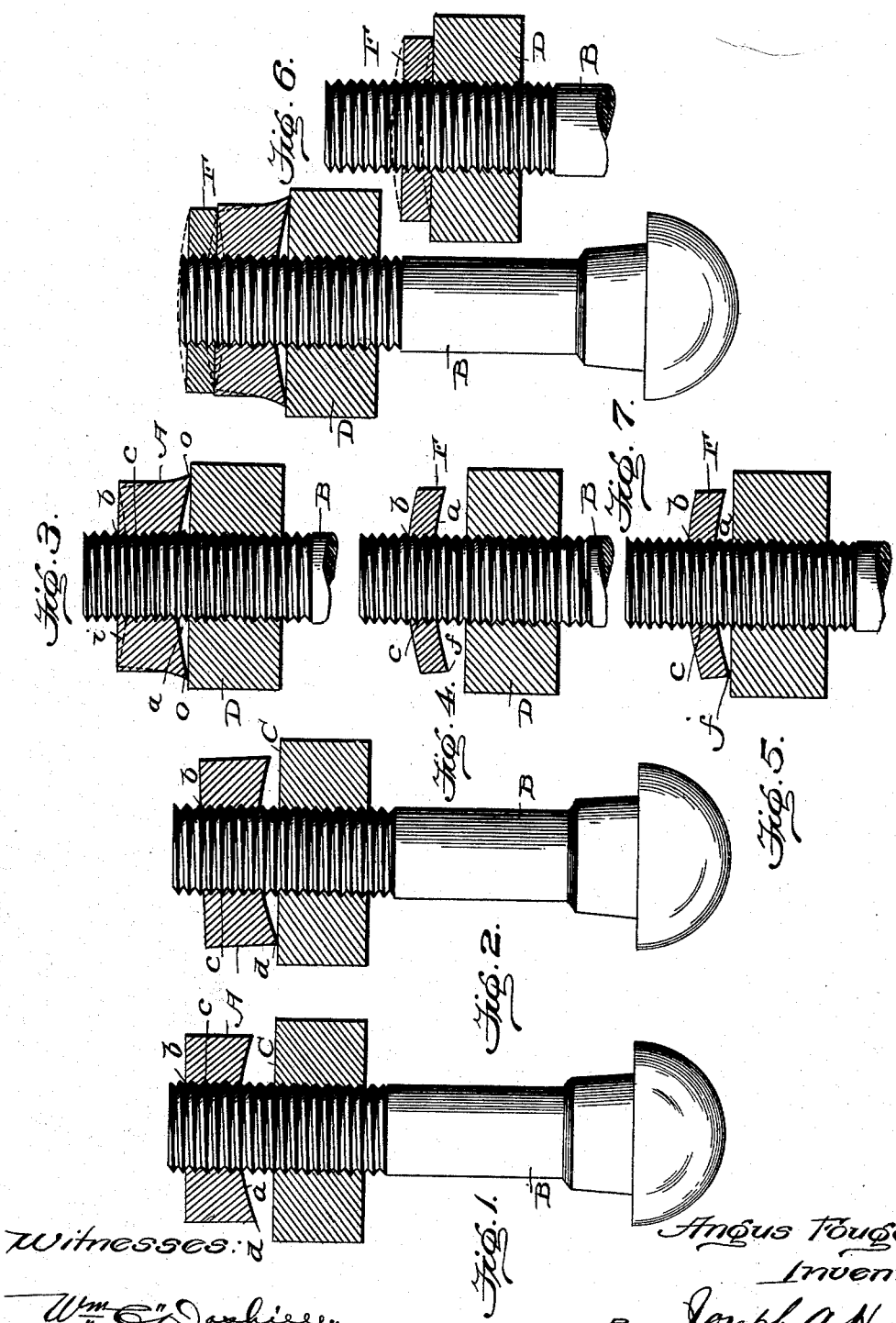
Witnesses:
Wm C. Dashiell
John Edington
Angus Fougère
Inventor
By Joseph A. Harris,
Atty

UNITED STATES PATENT OFFICE.

ANGUS FOUGÈRE, OF MONCTON, CANADA, ASSIGNOR TO RICHMOND H. CUSHING AND JOSEPH A. HARRIS, OF SAME PLACE.

NUT-LOCK.

SPECIFICATION forming part of Letters Patent No. 522,937, dated July 10, 1894.

Application filed October 22, 1891. Serial No. 409,512. (No model.)

*To all whom it may concern:*

Be it known that I, ANGUS FOUGÈRE, a subject of the Queen of Great Britain, residing at Moncton, in the Province of New Brunswick, Canada, have invented certain new and useful Improvements in Lock-Nuts or Nut-Locks; and I do hereby declare the following to be a full, clear, and exact description of the invention, such as will enable others skilled in the art to which it appertains to make and use the same.

The nature of the present invention relates to a torsional lock for bolts which can be embodied either in a self-locking nut adapted to hold itself in position on the bolt and against the surface upon which it bears, or in an elastic yielding plate or washer adapted to be screwed upon the bolt, exteriorly to the primary nut, and designed to bear upon the bolt-threads and upon said primary nut to secure a compound frictional contact therewith, which results are due, first, to the increased friction attained between the lock and the surface against which the lock bears, and, second, to the tendency of the threads in the torsional lock to cross the threads of the bolt, whereby a strong torsional resistance is produced between the lock and the surface upon which it bears, and to the grip upon the bolt-threads, so that the lock must remain immovable upon the bolt, but at the same time a yielding tension is provided for the elastic torsional lock, which yielding of the elastic lock is very desirable in all cases where machinery is subjected to jars or bolts are liable to work loose in fish-plates of rails.

The torsion lock when embodied in the form of the elastic plate or washer resembles, somewhat, the device patented to me February 10, 1891, No. 465,094, but in the present improvement I contemplate making a torsional lock with a concavity on its inner side or base which bears against the work, and forming in the lock threads which are cut with their axes oblique to the axis of said torsional lock, so that, when the lock is screwed on the bolt, it will assume a diagonal position to the longitudinal axis of the bolt, and as it is screwed home against the surface upon which it is designed to bear, said lock is deflected from its diagonal position to a straight position parallel to and tightly against the work. The principle of these improvements is, in the first place, to compress the upper and outer threads of the torsional lock against the threads of the bolt as the inner concave side or base of the torsional lock is screwed against the metallic surface, so that by this strong pressure between the lock and the metallic surface, and between the lock-threads and the bolt-threads, the inner concaved side or case of the lock is caused to spread or open out as the frictional contact between the lock and the metallic surface is increased, that is to say, while the outer edges of the lock and its lower or inner threads, are caused to spread at the concaved base or inner side of the lock, the outer and upper threads thereof will be compressed and drawn together tightly against the threads of the bolt; and, in the second place, to produce a compound frictional contact between the concave inner side or base of the lock and the surface on which it bears, which is due to the diagonal threads in the lock, which threads cause the lock to assume the inclined position on the bolt on which the lock is screwed, thus bringing one edge of the lock first in contact with the metallic surface, and as the lock is screwed home against said surface, to deflect the lock from its initial diagonal position to a position at right angles to the bolt-axis and parallel with the surface on which the lock bears, thereby causing the lock-threads to bind still more tightly and secure for the device an increased frictional pressure.

When the lock is made in the form of the elastic plate or washer, it possesses the desirable quality, in addition to that of being immovably fastened in place, of affording a torsional spring resistance which is very desirable in all cases where machinery is subjected to jars or the bolts are liable to work loose in fish-plates of rails, &c.

A nut designed to lock itself on the bolt and against a metallic surface is made somewhat thicker and stronger than the elastic yielding plate or washer, which latter device is designed to fasten a primary nut; but both the self-locking nut and the plate or washer embodying my improvements can be used on the same bolt to lock the nut itself on said bolt, or they can be used in connection with a primary nut where greater strength and length of thread are required for the bolt, as the improved self-locking nut acts as a very powerful and effective jam-nut.

In the accompanying drawings, forming a part of this specification, Figures 1, 2 and 3 are views showing the bolt in elevation, the line of the surface against which the nut bears, and the different positions of the self-locking nut when it is first applied to the bolt, when partly screwed up against the metallic surface or work, and its final position when screwed home and deflected parallel to the surface of the work. Figs. 4, 5 and 6 are elevations of the bolt and primary nut with sectional views of the elastic yielding plate or washer showing, respectively, the positions said washer or plate assumes as fitted on the bolt, partially screwed against the primary nut, and its final position when screwed home against the nut. Fig. 7 is a view showing the bolt and primary nut in connection with my lock-nut and elastic yielding plate or washer.

Like letters of reference denote corresponding parts in all the figures of the drawings.

The leading features of the present improvement in torsional locks for bolts are a concavity on the base or inner side of the lock and threads cut with their axes oblique to the axis of the torsion lock or nut. These novel features are embodied in a self-locking nut shown by Figs. 1, 2 and 3, and in an elastic yielding plate or washer shown by Figs. 4, 5 and 6.

In Figs. 1, 2 and 3, A is the lock-nut embodying the improvements, which lock-nut is designed to be screwed on the threaded part of the bolt, B, and to bear against the metallic surface or work, C, or against what is the equivalent of said metallic surface, the primary nut, D, as shown by Fig. 7.

In Figs. 4, 5, and 6, the lock is shown at F, and it is made in the form of an elastic spring plate or washer, threaded as described, to screw on the bolt, B, and bear against the work, which in this instance, is the primary nut, D, on the bolt B; or, as in Fig. 7, the elastic washer may be screwed home against the lock-nut, A, the latter in this instance serving as a powerful jam-nut.

In Figs. 1, 2 and 3, the lock-nut, A, is made of suitable thickness, and it may be made of the same metal as ordinary nuts, Swedish iron being found suitable for spreading and compressing the nut and its threads. This lock-nut has a concavity, $a$, formed on its inner side or base, and in the bolt-hole, $b$, of said nut is formed the thread, $c$, which is cut with its axis oblique to the axis of the lock-nut. As the nut is fitted on the bolt, it assumes a diagonal position to the longitudinal axis of the bolt, and as the nut is screwed against the surface, C, the edge, $d$, of the nut first contacts with the surface C on one side of the bolt, see Fig. 2. Force is applied to the nut to cause it to turn on the bolt-threads and screw said nut tightly against the surface, C, until the nut assumes a position parallel to the surface, C, and at right angles to the bolt; and as the nut is thus deflected from its diagonal position to a parallel position, its inner concaved side is flattened or spread out so that its edges bind, as at $o, o$, in Fig. 3, against the work, while its outer part, at the center, is depressed, as at $i, i$, in Fig. 3, thereby causing the outer threads to cross and lock with the threads of the bolt, whereby the nut, A, is caused to tightly lock itself against the surface or work, C.

In Figs. 4, 5 and 6, the elastic plate or washer, F, is made thinner than the lock-nut, A, and I prefer to make it of a piece of common mild steel which I find is sufficiently resilient to give the desired flexibility to the comparatively thin washer or plate while it retains the advantages of the thicker nut which may contain more threads than the elastic plate. This elastic plate is made concavo-convex in form to provide the concavity, $a$, on the inner side or base thereof, and in its bolt-hole, $b$, is cut one or more threads, $c$, said threads being cut with their axes oblique to the axis of the elastic plate. The elastic plate, F, when fitted on the bolt, assumes the diagonal position shown by Fig. 4, and its edge, $f$, first contacts with the nut, D, when the plate, F, is screwed far enough on the bolt to be brought against the nut. As force is applied to the locking plate, F, it yields or gives until both of the edges, at the inner base side thereof, contact with the nut, D, and its center is depressed, as shown by Fig. 6, the dotted lines indicating the initial position of the washer. This spring plate thus secures a compound frictional contact with the nut, and its threads cross and lock with the bolt-threads; but in addition to holding itself and the nut in position on the bolt, this spring plate affords a yielding tension which compensates for jar and vibration of the machinery, rails, &c.

In cutting the inclined thread in my improved torsion lock-nut or in the torsion yielding plate it is not my intention to deflect or bend the bolt in any way. This purpose has been accomplished by other devices than mine where it has been the avowed and manifest purpose to rely solely upon deflecting or bending the bolt, in which case a much thicker and heavier nut is required than I employ. On the contrary, this deflection of the bolt is what I seek to avoid and at the same time obviate any effect that would tend to rupture or destroy the threads on the bolt or in the lock, so that my device can be readily taken off by a quick movement of the wrench and used again if required, which removal would be a very difficult and tedious operation if the bolt had to be first straightened.

The yielding concavo-convex plate or washer may have a few threads formed diagonally therein, just sufficient to cross and lock with the threads of the bolt, and I may here observe that the inclined threads in this yielding concavo-convex plate may produce a slightly different result than in the thicker concaved lock-nut as there will be a somewhat different movement at the base when the screw pressure is applied. The thicker lock-nut will spread more and so compress more threads of the bolt while the thin plate will yield at its outer edges but its center will move forward toward the primary nut, giving more spring resistance with the proportionate compression, the slight inclination of the threads to cross greatly assisting the tightening process.

In practice, the nut, A, is used as a self-locking nut, while the comparatively thin concavo-convex plate, F, containing a few threads, but having a flexible yielding quality, adapts itself better as a nut lock, to be applied exteriorly to a primary nut.

My improvements are especially applicable to the various forms of locks herein shown, but they can be used on other forms of nuts.

Having thus fully described my invention, what I claim as new, and desire to secure by Letters Patent, is—

1. A torsion lock having the threads cut with their axes oblique to the axis of said lock, and provided with a concavity, regular in form, extending from edge to edge thereof in its inner side or base, whereby the inner concave side or base of the lock is adapted to first contact with one side of a primary nut or other surface and produces a binding friction upon the threads of the bolt, and this frictional contact is increased by the compression of the upper threads in said torsion lock as the concave surface of the lock is spread or flattened against a primary nut or other surface, without deflecting the bolt, substantially in the manner and for the purposes specified.

2. The combination with a bolt and a primary nut, of a concavo-convex yielding plate or washer having a thread cut therein with its axis oblique to the axis of said plate or washer and fitted on the bolt exteriorly to the primary nut thereon, said plate or washer, when screwed home against said primary nut, being deflected from its initial diagonal position on the bolt by contact with said nut and bearing against the same with increased torsional spring contact, the base of said plate or washer being thereby spread or flattened and its outer threads being caused to bind forcibly against the threads of the bolt, substantially as set forth.

3. The combination with a bolt, and a primary nut or equivalent surface, of a torsion lock provided with a concavity on its inner side or base and with threads cut with their axes oblique to the axis of the lock, said torsion lock being screwed on the bolt and having its concave inner side flattened or spread by pressure against the nut or equivalent surface and with its outer threads crossed or locked with the threads of the bolt, whereby the frictional contact is increased between the lock and the surface against which it exerts pressure by the resistance of the crossed threads in the lock and on the bolt, substantially as described.

4. As an article of manufacture, a torsion lock provided with a concave inner side or base and with a threaded bolt-hole, said threads being cut with their axes oblique to the axis of the torsion lock, substantially as described, for the purposes set forth.

5. As a new article of manufacture, a torsion lock comprising an elastic concavo-convex plate provided with threads cut with their axes oblique to the axis of the torsion-lock, substantially as described, for the purposes set forth.

In testimony whereof I affix my signature in the presence of two witnesses.

ANGUS FOUGÈRE.

Witnesses:
GEORGE MCDONALD,
ALEXR. FRASER.